(12) United States Patent
Itabashi et al.

(10) Patent No.: US 7,284,063 B2
(45) Date of Patent: *Oct. 16, 2007

(54) INFORMATION PROCESSING APPARATUS, INFORMATION PROCESSING METHOD, AND TRANSMITTING MEDIUM

(75) Inventors: Tatsuo Itabashi, Tokyo (JP); Kimiyoshi Yoshida, Kanagawa (JP)

(73) Assignee: Sony Corporation, Tokyo (JP)

(*) Notice: Subject to any disclaimer, the term of this patent is extended or adjusted under 35 U.S.C. 154(b) by 41 days.

This patent is subject to a terminal disclaimer.

(21) Appl. No.: 10/688,344

(22) Filed: Oct. 17, 2003

(65) Prior Publication Data

US 2004/0078473 A1    Apr. 22, 2004

Related U.S. Application Data

(60) Continuation of application No. 10/444,775, filed on May 23, 2003, now Pat. No. 6,842,752, which is a continuation of application No. 09/939,366, filed on Aug. 24, 2001, now Pat. No. 6,601,092, which is a division of application No. 09/169,505, filed on Oct. 9, 1998, now Pat. No. 6,308,203.

(30) Foreign Application Priority Data

Oct. 14, 1997 (JP) .................................. 9-280154

(51) Int. Cl.
G06F 17/30 (2006.01)

(52) U.S. Cl. ............................. 709/229; 707/9; 705/17

(58) Field of Classification Search ................ 709/229, 709/217, 202; 707/9, 10, 1; 726/3, 4; 705/27, 705/17, 14

See application file for complete search history.

(56) References Cited

U.S. PATENT DOCUMENTS

| 5,710,884 | A |   | 1/1998 | Dedrick |
| 5,721,827 | A |   | 2/1998 | Logan et al. |
| 5,727,163 | A | * | 3/1998 | Bezos ........................ 705/27 |
| 5,754,938 | A | * | 5/1998 | Herz et al. .................. 725/116 |
| 5,908,469 | A |   | 6/1999 | Botz et al. |
| 5,933,811 | A | * | 8/1999 | Angles et al. ................ 705/14 |
| 5,960,411 | A | * | 9/1999 | Hartman et al. ............. 705/26 |
| 6,073,106 | A | * | 6/2000 | Rozen et al. .................. 705/3 |
| 6,092,197 | A |   | 7/2000 | Coueignoux |

(Continued)

FOREIGN PATENT DOCUMENTS

GB          2385157 A  *  8/2003

(Continued)

Primary Examiner—Kenneth R. Coulter
(74) Attorney, Agent, or Firm—Sonnenschein Nath & Rosenthal LLP

(57) ABSTRACT

Personal information of a user is provided to an information provider from any location, through a simple apparatus, and with reliability. Personal information is stored beforehand in a user profile database of a server. When the user accesses a service provider device from a terminal device through the server and the Internet, the service provider device requests the terminal device to enter the personal information of that user. The server reads the requested personal information from the user profile database and transfers the personal information from a proxy device to the service provider device. This novel arrangement makes it unnecessary for the terminal device to input the personal information on its own.

4 Claims, 12 Drawing Sheets

U.S. PATENT DOCUMENTS

| | | |
|---|---|---|
| 6,115,709 A | 9/2000 | Gilmour et al. |
| 6,216,128 B1 * | 4/2001 | Di-Crescenzo et al. ....... 707/10 |
| 6,886,101 B2 * | 4/2005 | Glazer et al. ............... 713/200 |
| 2002/0019817 A1 * | 2/2002 | Matsui et al. .................. 707/1 |

FOREIGN PATENT DOCUMENTS

| | | |
|---|---|---|
| JP | 07-093665 | 4/1995 |
| JP | 08023315 A | 1/1996 |
| JP | 08-072997 | 3/1996 |
| JP | 09-016682 | 1/1997 |
| JP | 09-114783 | 5/1997 |
| JP | 09-114891 | 5/1997 |
| JP | 09-134389 | 5/1997 |
| JP | 09-167185 | 6/1997 |
| JP | 09-179912 | 7/1997 |
| JP | 09-212548 | 8/1997 |
| JP | 09204445 A | 8/1997 |

* cited by examiner

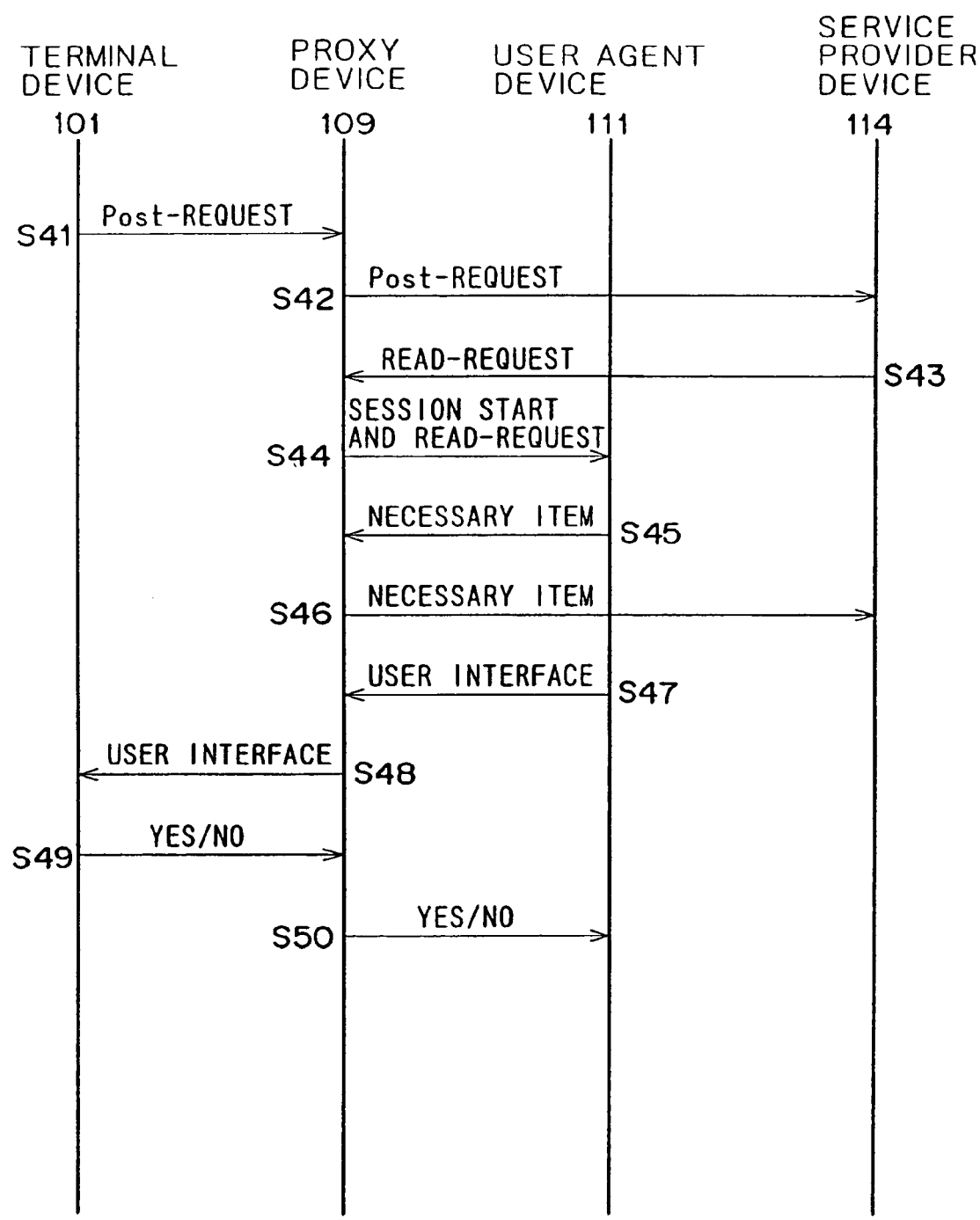

INFORMATION PROCESSING APPARATUS, INFORMATION PROCESSING METHOD, AND TRANSMITTING MEDIUM

RELATED APPLICATION DATA

The present application claims priority to Japanese Application No. 10-3067357, filed Oct. 14, 1997, and is a continuation application of copending U.S. application Ser. No. 10/444,775, filed May 23, 2003, now U.S. Pat. No. 6,842,752 which is a continuation of Ser. No. 09/939,366, filed Aug. 24, 2001, now U.S. Pat. No. 6,601,092 which is a divisional of U.S. application Ser. No. 09/169,505, filed on Oct. 9, 1998, now U.S. Pat. No. 6,308,203, all of which are incorporated herein by reference to the extent permitted by law.

BACKGROUND OF THE INVENTION

The present invention generally relates to an information processing apparatus, an information processing method, and an information transmitting medium and, more particularly, to an information processing apparatus, an information processing method, and an information transmitting medium that are adapted to receive information from an information provider by use of personal information existing on a network with a relatively simple terminal device from any desired location.

With the recent popularization of the Internet, various pieces of information have come to be available. These pieces of information include the provision of a product purchase service and other various services.

For example, when accessing a predetermined service or information provider through the Internet to purchase a predetermined product through the home page of that service or information provider, a user must input personal information such as his or her name, age, address, telephone number, and credit card number to submit these pieces of information to the provider. When accessing two or more service or information providers to acquire plural products, the user must submit his or her personal information to each of these providers every time he or she places an order. Usually, the personal information to be submitted to these providers is substantially the same in content. Therefore, the user needs to input the same information repeatedly, a time-wasting and error-prone operation.

To overcome this inconvenience, OPS (Open Profiling Standard), for example, provides on the user's personal computer, as application programs, a user profile recorded with the user's personal information and a user agent for providing this user profile to service or information providers on behalf of the user as required. This system therefore frees the user from inputting the same personal information every time he or she accesses the service or information providers.

However, in this approach, each user must prepare the user agent as the application program on his or her own. Consequently, if a revision is made in a communication protocol or format used, the user must update the application program accordingly, thereby presenting a problem of increased user load.

In addition, a mobile terminal device for accessing information or service providers from outside the home is generally designed with emphasis placed on mobility and low cost and therefore is inferior in capability to a desktop computer. This often presents a problem of disabling the user to make access from the mobile terminal device to information or service providers in the same communication environment in which the access is made from the desktop computer.

This problem may be solved by providing a rewritable memory device to add or extend capabilities but at the cost of complicated device constitution.

SUMMARY OF THE INVENTION

It is therefore an object of the present invention to provide an information processing apparatus, an information processing method, and an information transmitting medium that allow a user to receive the provision of information in a simple and low-cost manner from any location always in the same communication environment.

In carrying out the invention and according to one aspect thereof, there is provided an information processing apparatus comprising: a storage means for storing personal information of a plurality of users; and a providing means for providing the personal information stored in the storage means to the information processing device of the information provider on behalf of the information processing device of the user when access to the personal information comes from the information processing device of the user and a request for the personal information comes from the information processing device of the information provider.

In carrying out the invention and according to another aspect thereof, there is provided an information processing method comprising the steps of: storing personal information of a plurality of users; and providing the personal information stored in the storage means to the information processing device of the information provider on behalf of the information processing device of the user when access to the personal information comes from the information processing device of the user and a request for the personal information comes from the information processing device of the information provider.

In carrying out the invention and according to still another aspect thereof, there is provided an information transmitting medium for transmitting a computer program comprising the steps of: storing personal information of a plurality of users; and providing the personal information stored in the storage means to the information processing device of the information provider on behalf of the information processing device of the user when access to the personal information comes from the information processing device of the user and a request for the personal information comes from the information processing device of the information provider.

In carrying out the invention and according to yet another aspect thereof, there is provided an information processing apparatus comprising: an access means for accessing the information processing device of the information provider through the server; and a control means for controlling the provision of the personal information stored in the storage means to the information processing device of the information provider by the server on behalf of any of the plurality of users when a request for the personal information comes from the information providing device of the information provider.

In carrying out the invention and according to a different aspect thereof, there is provided an information processing method comprising the steps of: accessing the information processing device of the information provider through the server; and controlling the provision of the personal information stored in the storage means to the information processing device of the information provider by the server on behalf of any of the plurality of users when a request for the personal information comes from the information providing device of the information provider.

In carrying out the invention and according to still different aspect thereof, there is provided a transmitting medium for transmitting a computer program comprising the steps of: accessing the information processing device of the information provider through the server; and controlling the provision of the personal information stored in the storage means to the information processing device of the information provider by the server on behalf of any of the plurality of users when a request for the personal information comes from the information providing device of the information provider.

In the information processing apparatus, the information processing method and the transmitting medium, personal information of a plurality of users is stored in the storage means and, when access to the personal information is made from the user and a request for the personal information comes from the information provider, the personal information is provided to the information provider on behalf of the user.

In the information processing apparatus, the information processing method and the transmitting medium, the server controls the provision of the personal information to the information provider when the server is accessed by the user and the information provider requests the server for the personal information.

BRIEF DESCRIPTION OF THE DRAWINGS

These and other objects of the invention will be seen by reference to the description, taken in connection with the accompanying drawing, in which:

FIG. 6 is a timing chart indicative of operations of the-terminal device 101, the proxy device 109, the user agent device 111, and the service provider device 114 shown in FIG. 1;

DETAILED DESCRIPTION OF PREFERRED EMBODIMENTS

Figure 1:
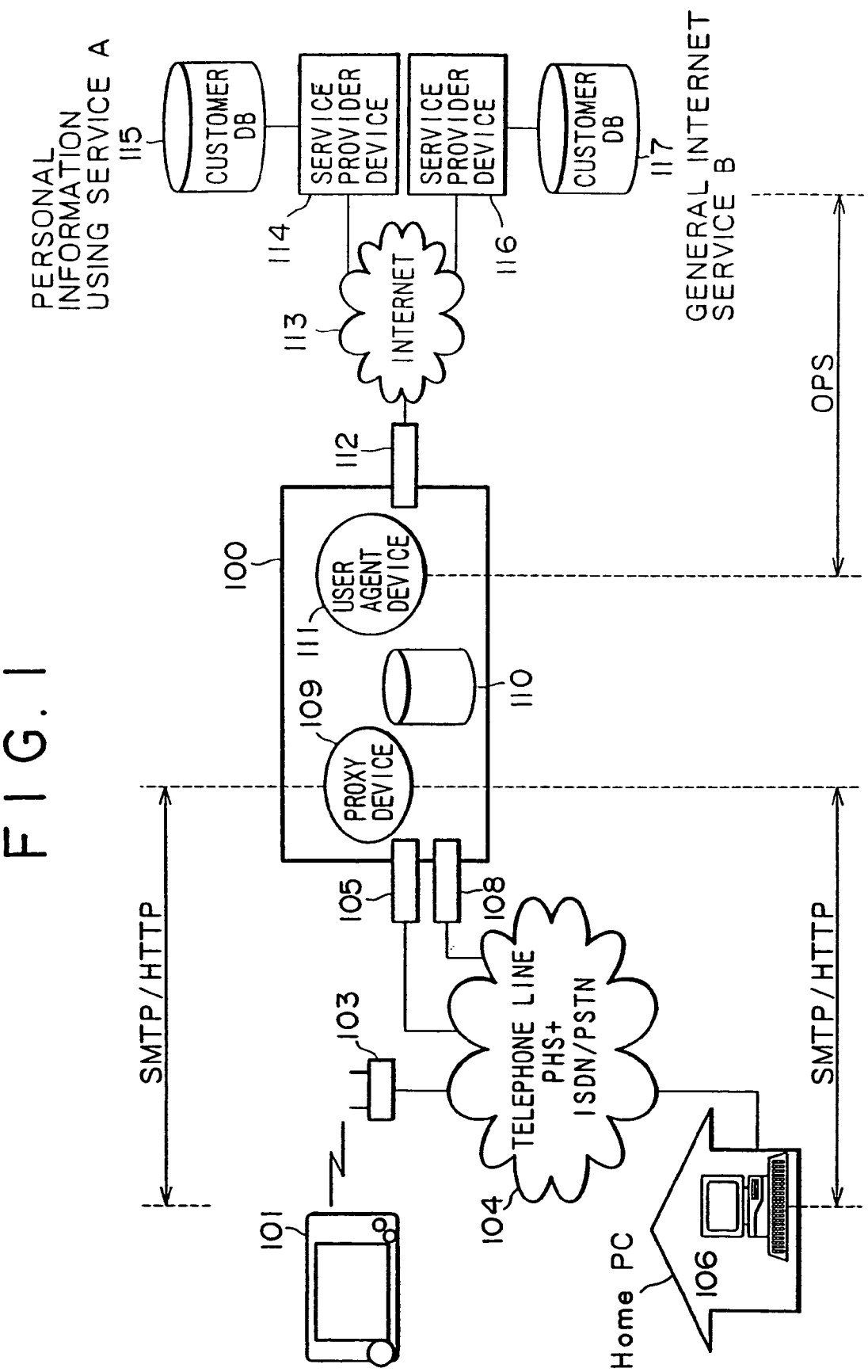
FIG. 1 is a schematic diagram illustrating a configuration example of a network system to which an information processing apparatus according to the invention is applied.

In the following, each of the means referred to in the appended claims is followed by an example of a corresponding embodiment enclosed by parentheses for easy understanding of the relationship between means and their embodiments. However, it will be apparent to those skilled in the art that such a description does not necessarily restrict each means to the described embodiment.

Now, an information processing apparatus in accordance with one embodiment of the present invention includes storage means (for example, a user profile database 110 shown in FIG. 1) for storing personal information of two or more users and a providing means (for example, a proxy device 109 shown in FIG. 1) for providing the personal information stored in the storage means to the information processing device of an information provider (for example, a service provider device 114 shown in FIG. 1) on behalf of the information processing device of a user (for example, a terminal device 101 shown in FIG. 1) when the providing means is accessed by the information processing device of the user and is requested by the information processing device of the information provider for providing the personal information.

The information processing apparatus of another embodiment of the present invention further comprises a decision means (for example, step S71 shown in FIG. 8) for determining whether in is necessary to get the permission by the user for the provision of the personal information stored in the storage mans and an inquiry means (for example, step S72 shown in FIG. 8) for inquiring, according to the decision made by the decision means, the information processing device of the user whether the personal information can be provided or not and receiving a reply therefor. According to the reply received by the inquiring means, the providing means provides the personal information stored in the storage means to the information processing device of the information provider.

The information processing apparatus of yet another embodiment of the present invention further comprises an authentication means (for example, step S1 shown in FIG. 2) for authenticating the user.

The information processing apparatus of still another embodiment of the present invention further comprises a detection means (for example, step S131 shown in FIG. 11) for detecting whether two or more access operations have been simultaneously made from a user whose personal information is stored in the storage means.

The information processing apparatus of still yet another embodiment of the present invention further comprises another detection means (for example, step S132 shown in FIG. 11) for detecting unauthorized access to the personal information.

An information processing apparatus of a still further embodiment of the present invention comprises an access means (for example, step S21 shown in FIG. 4) for accessing an information processing device of an information provider through a server and a control means (for example, step S27 shown in FIG. 4) for controlling the provision by the server of personal information stored in a storage means to the information processing device of the information provider on behalf of a user when a request for the personal information comes from the information processing device of the information provider.

This invention will be described in further detail by way of example with reference to the accompanying drawings.

FIG. 1 shows an overall constitution of a network system to which an information processing apparatus according to the invention is applied. As shown, a terminal device 101 to which the information processing apparatus according to the invention is applied incorporates a PHS (Personal Handyphone System) and has capabilities equivalent to those of a personal computer 106 of a user of this system.

The terminal device 101 has a communication protocol stack composed of protocols that are in conformity with PIAFS (PHS Internet Access Forum Standard) for the data transmission standards having an error correction capability, PPP (Point to Point Protocol), which is synchronous digital communication capability having authentication between adjacent two points, and SMTP (Simple Mail Transfer Protocol) for stored transmission and are independent of TCP (Transfer Control Protocol) for the transport layer and application protocols that are in conformity with HTTP (HyperText Transfer Protocol) for supporting realtime interaction and are independent of TCP for the transport layer. In addition, the terminal device 101 has, by way of example, a bit-map display device, a touch panel, and a speaker device, all not shown, as user interfaces sufficient for securely providing a server 100 of user's intentions and securely receiving information from the server 100.

The server 100 is constituted by a group of computers connected to a telephone line 104 through cable (PIAFS) interfaces 105 and 108 and to the Internet 113 through a cable interface 112. The cable interface 108 is an ISDN (Integrated Services Digital Network) terminal adapter that provides the capabilities up to the ISDN layer 3 protocol. On the other hand, the cable interface 105 provides the PIAFS protocol capability under the control of the cable interface 108 as the data transmission standard having an error correction capability. The cable interface 112 is an IP (Internet Protocol) router device that provides a packet routing capability of the IP.

The computer group has at least a proxy device 109, a user profile database 110 storing personal information of plural users, and a user agent (UA) 111 of P3P (Platform for Privacy Preference Project) as computer programs, thereby realizing a proxy agent service capability for providing personal information. The server 100 provides additional basic capabilities of processing the PPP, HTTP, and SMTP protocols forming the higher layer of the communication interface provided by the cable interface 105 and processing the TCP UDP (User Datagram Protocol) forming the higher layer of the communication interface provided by the cable interface (IP router) 112 and associated Internet protocols. Further, the server 100 has the data and interface for controlling itself.

The terminal device 101 and the server 100 establish communication therebetween in the following procedure. First, the terminal device 101 is connected to a station 103 by the PHS that functions as an incorporated wireless interface. The station 103 may be a public cell station (CS) or a home station (HS). When the terminal device 101 performs operations for call origination to start communication, a request for call origination is sent to the station 103 through a normal PHS procedure. A request for termination is sent through the telephone line 104 to the cable (PIAFS) interface 105 of the server 100, which is a desired destination of the communication, upon which a call is established. Then, based on PIAFS, a data transfer session having an error correction capability is established. After PPP authentication, a data transfer session is established between the terminal device 101 and the proxy device 109 of the server 100. It should be noted that a call from the server 100 to the terminal device 101 may also be established. In this case also, call establishment is performed by the standard operation specified in each communication protocol.

Through the data transfer session thus established between the terminal device 101 and the proxy device 109 of the server 100, communication between the user of the terminal device 101 and a service provider device 114 for using personal information via a network or a service provider device 116 for providing various services via the Internet 113 is prepared by use of simple application protocols in conformity with HTTP or SMTP on both sides of the communication.

On the other hand, the server 100 and the Internet 113 are in a normally linked state. The server 100 is adapted to normally transfer packets with the service provider device 114 or the service provider device 116 over the Internet 113.

The personal information providing capability by the terminal device 101 and the server 100 is available when the terminal device 101, the server 100, and the service provider device 114 or the service provider device 116 are enabled for communication between each other or when communication between the terminal device 101 and the server 100 is disconnected temporarily.

The proxy device 109 of the server 100 performs communication with the terminal device 101 by such simplified protocols as SMTP and HTTP, and, at the same time, performs communication with the service provider device 114 having a customer database 115 and the service provider device 116 having a customer database 117 by use of the TCP/IP protocol via the Internet 113. The proxy device 109, in cooperation with the user agent device 111, generates the user interface for personal information control from time to time and provides the generated user interface to the terminal device 101, thereby confirming user's intention and outputting the information to the user. Because the proxy device 109 has a personal information control (for example, P3P or OPS) required on the Internet 113 side, the terminal device 101 can be connected, independently of these protocols, to the server 100 only by use of the simplified protocols for providing the user interface.

The user profile database device 110 of the server 100 stores the private data (or personal information) of each user that provides the nucleus of the personal information providing service. The user owns the access right of this database, on which strict access control is performed in a form specified in the applied personal information control standard (OPS in the present embodiment).

The user agent device 111 of the server 100 performs communication with the service provider device 114 in a form specified in the applied personal information control standard (OPS). For the service provider device 114, an ordinary personal computer to be connected to a network provides the same interface as that provided when OPS is applied.

The user agent device 111 is provided with a communication port by the proxy device 109 at the start of an OPS session, starting communication with the service provider device 114. At this time, in order to mitigate the processing load at providing a user interface to be described later, both the user agent device 111 and the proxy device 109 each may have an identifier for recognizing each other. In execution of the OPS session, the user agent device 111 writes data to and/or reads data from the user profile database 110. In execution of the OPS session, the user agent device 111 also requests the proxy device 109 for generating a user interface on behalf of the user agent device 111 if it is necessary for the user agent device 111 to inform the user or seek a decision by the user.

User interface generation by the proxy device 109 is realized by either a form written in HTML (Hypertext Markup Language) or the like received from the service provider device 114 or newly generating a user interface image that does not exist in the OPS session. In the former, a user interface image coming from the OPS protocol is transferred to the proxy device 109. This user interface image is then transferred from the proxy device 109 to the terminal device 101 over the above-mentioned communication path by use of an HTTP interface or the like, being displayed on a display monitor of the terminal device 101. If the system is configured so that a reply is enabled by use of the HTML form capability and so on, a feedback (or a reply) by the user to be inputted from the terminal device 101 is also returned to the user agent device 111 via the proxy device 109, being transferred to the service provider device 114 through the Internet 113.

In the case of the latter, namely if the server 100 requires a user interface on its own in order to ask the user for an instruction or inform the user rather than using a user interface generated by the information service provider 114, the user agent device 111 sends its own identifier and the information necessary for configuring the user interface to the proxy device 109. Receiving the identifier and the information, the proxy device 109 calls its user interface generating capability, generates the user interface, and sends the generated user interface to the terminal device 101. If a user replay comes, the data is interpreted by the proxy device 109 and translated into a compatible internal information format, the resulting data being sent to the user agent device 111.

Thus, because the proxy device 109 undertakes the user interface generating capability, both simplification of the terminal device 101 and generalization of user agent device 111 are achieved at the same time. Also, an embodiment in which the user interface generating capability is imparted to the terminal device 101 or the user agent device 111 is practicable.

The following describes a flow of communication among the terminal device 101, the proxy device 109, the user agent device 111, and the service provider device 114 by use of a typical information exchange sequence for example.

Figure 2:
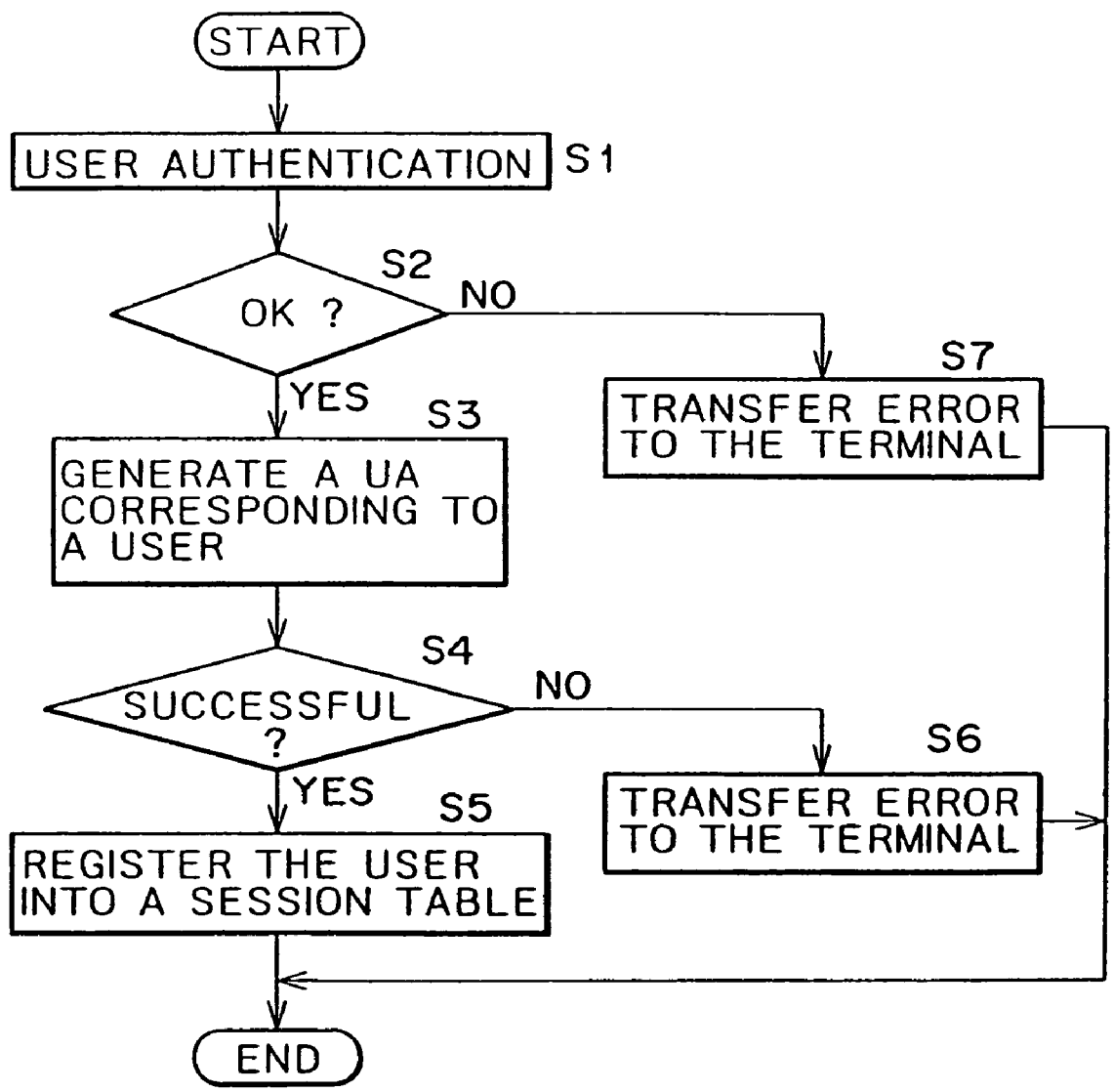
FIG. 2 is a flowchart indicative of an operation at starting access on a terminal device 101 and a server 100 shown in FIG. 1.

The user agent device 111 is not always generated but is generated when the terminal device 101 accesses the server 100. FIG. 2 shows an example of processing to be executed in this case.

First, in step S1, the proxy device 109 executes user authentication processing when the terminal device 101 tries to access the server 100. To be more specific, the proxy device 109 receives the ID and password assigned to the user from the terminal device 101 and determines whether the received ID and password match those of the user whose personal information is stored in the user profile database 110. In step S2, the proxy device 109 determines an authentication result. If the proxy device 109 finds that the ID and password inputted from the terminal device 101 do not match the ID and password stored in the user profile database 110, then, in step S7, the proxy device 109 sends an error message to the terminal device 101, ending the processing. Namely, in this case, the access from the terminal device 101 to the server 100 is rejected.

In step S2, if the ID and password inputted from the terminal device 101 are found matching those stored in the user profile database 110, then, in step S3, the proxy device 109 generates the user agent device 111 corresponding to that user. Then, in step S4, the proxy device 109 determines whether the user agent device 111 for the user has been generated successfully. If yes, then, in step S5, the proxy device 109 registers the user into an incorporated session table to store the fact that a session has been established with that user. If, in step S4, the user agent device 111 is found not generated successfully for reasons of memory shortage or processing overload, then in step S6, the proxy device 109 sends an error message to the terminal device 101, ending the processing.

Figure 3:
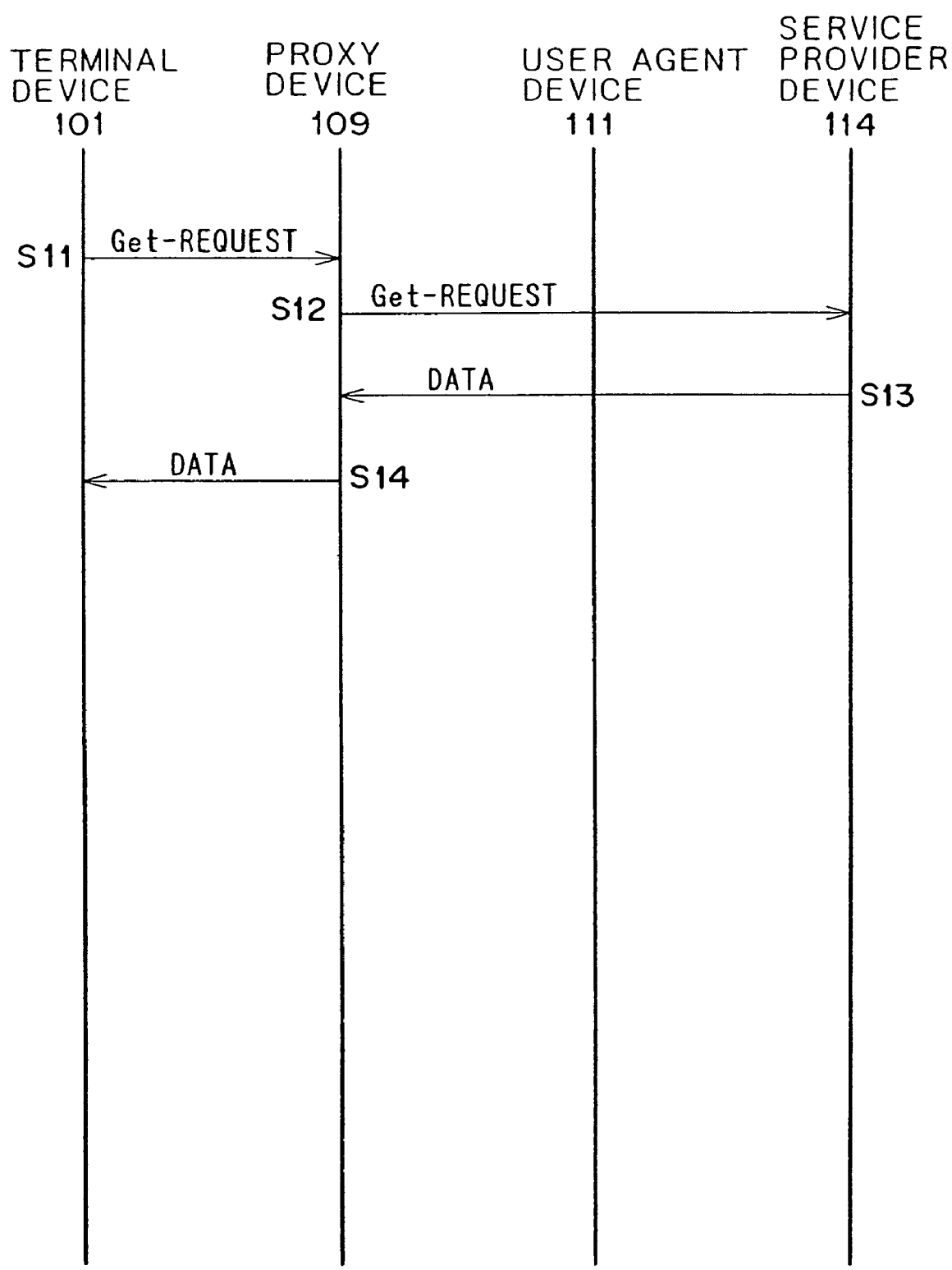
FIG. 3 is a timing chart indicative of operations of the terminal device 101, a proxy device 109, a user agent device 111, and a service provider device 114 shown in FIG. 1.

The following describes operations for receiving a WWW (World Wide Web) service by use of the HTTP protocol, for example, from the service provider device 114 without the use of the personal information control (OPS), with reference to the timing chart shown in FIG. 3.

First, in step S11, the terminal device 101 having no TCP/IP communication stack issues a request to get to the proxy device 109. In step S12, the proxy device 109 sends a request to get the same contents to the service provider device 114 through the cable interface (IP router) 112 and the Internet 113 as a packet on the TCP/IP protocol. In step S13, according to the request, the service provider device 114 sends data to the proxy device 109 as a TCP/IP packet. In step S14, the proxy device 109 reports the result of this session to the terminal device 101, upon which the first request to get completes.

Figure 4:
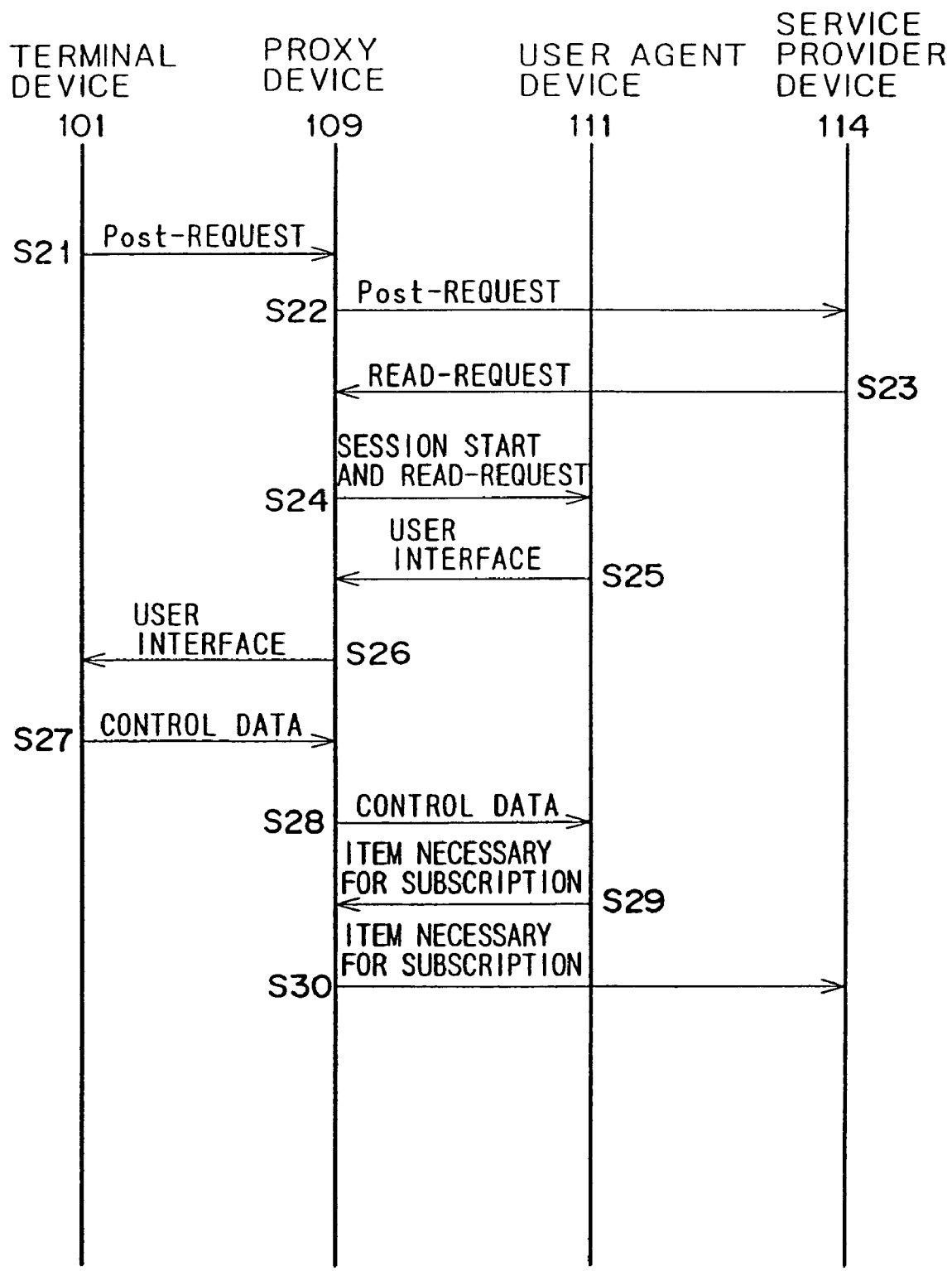
FIG. 4 is a timing chart indicative of operations of the terminal device 101, the proxy device 109, the user agent device 111, and the service provider device 114 shown in FIG. 1.

The following describes a processing operation in which the user receives the provision of a service using the personal information control (OPS), with reference to the timing chart shown in FIG. 4. It is assumed here that the user enters a lot by use of the WWW. In step S21, the terminal device 101 outputs a request to post to the proxy device 109. In step S22, the proxy device 109 transfers this request to service provider device 114. In step S23, before providing the information necessary for lot entering to the terminal device 101, the service provider device 114 outputs a request to read of OPS to the proxy device 109 in order to obtain the personal information of the user. The proxy device 109 determines whether the request from the service provider device 114 is not a part of HTTP but a part of OPS session (namely, the request is for the provision of personal information). If yes, the proxy device 109 informs the user agent device 111 of the start of the session and sends a request to read to the user agent device 111.

In step S25, before sending the personal information requested by the request to read coming from the proxy device 109 to the service provider device 114 on behalf of the terminal device 101, the user agent device 111 transfers, for the user of the terminal device 101 that is the owner of that personal information, a user interface for confirmation transmitted from the service provider device 114 to the proxy device 109. The data of this user interface is transferred from the proxy device 109 to the terminal device 101 in step S26. Consequently, an image of the user interface such as shown in FIG. 5 is displayed.

Figure 5:
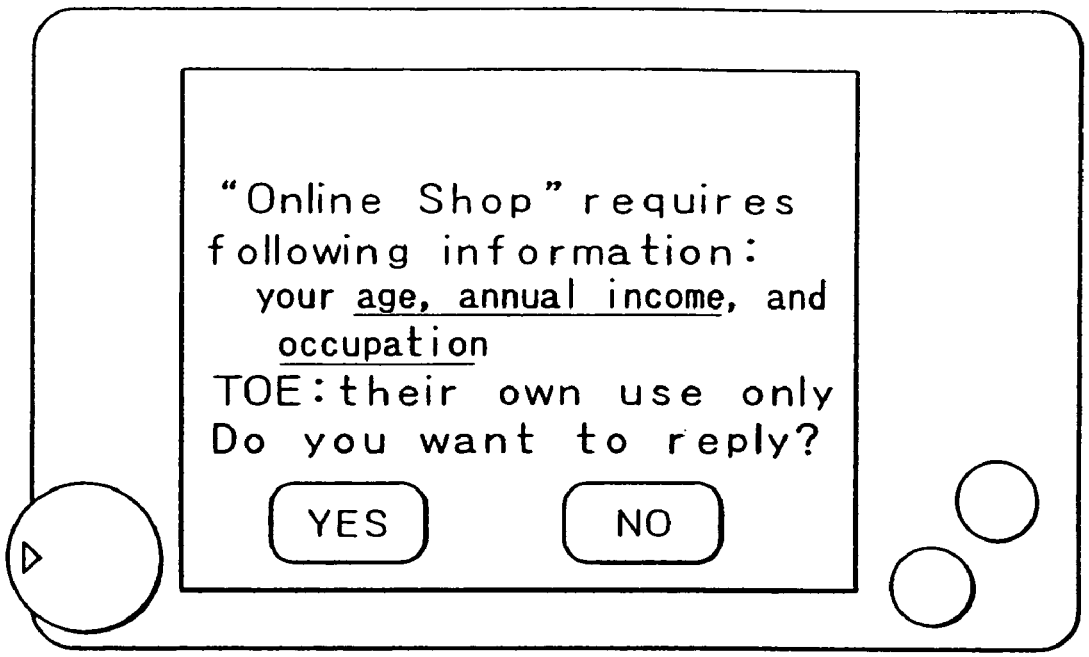
FIG. 5 is a display example of the terminal device 101 in step S26 of FIG. 4.

As shown in FIG. 5, in this user interface, a button (YES) to be operated when the user agrees that the server 100 provides the personal information of the user to the service provider device 114 on behalf of the terminal device 101, and a button (NO) to be operated when the user does not agree, are displayed. The user operates the YES button to agree that the server 100 provide his or her personal information to the service provider device 114 or the NO button to not agree.

When the user operates the button, the control data corresponding to the operation done is transferred from the terminal device 101 to the proxy device 109 in step S27. In step S28, the proxy device 109 transfers this control data to the user agent device 111. If the control data for the user to reject the provision of the personal information is inputted in the service provider device 114, the user agent device 111 rejects the provision of the personal information stored in the user profile database 110. On the other hand, if the user agrees with the provision of the personal information, the user agent device 111 reads, from the user profile database 110, a part of the personal information of that user that is requested by the service provider device 114 and, in step S29, transfers the requested information to the proxy device 109. In step S30, the proxy device 109 transfers the personal information received from the user agent device 111 to the service provider device 114.

The personal information transferred to the service provider device 114 in step S30 is one that was registered by the user into the user profile database 110 (this registration is made from the personal computer 106 in the home for example). Therefore, the user need not input his or her personal information every time access is made to the server 100, thereby saving time and preventing input errors from occurring.

It should be noted that user interface shown in FIG. 5 can be used as transmitted from the service provider device 114 without change. It is also practical to reconfigure the user interface information in the user agent device 111 or the proxy device 109 as required. The reconfiguration will be described later with reference to the flowchart of FIG. 9.

As described, in normal OPS session, the user need not be informed of the provision of the personal information. The following describes an example in which a user interface is generated separately from the OPS session at the discretion of the user agent device 111 and the user is informed of the user interface thus generated, with reference to the timing chart shown in FIG. 6. In the example of FIG. 6, every confirming operation to be performed by the user interface is omitted, the number of access operations performed is counted by an incorporated counter (not shown), and, when the count value has reached a predetermined value, a confirming operation for the user is performed.

First, in step S41, the terminal device 101 outputs a request to post to proxy device 109. In step S42, the proxy device 109 transfers the received request to post to service provider device 114. In step S43, in response to this request, the service provider device 114 informs the proxy device 109 of the start of the session and sends a request to read the personal information of OPS to the proxy device 109. In step S44, in response to the received request to read, the proxy device 109 informs the user agent device 111 of the start of the session and sends the request to read to the user agent device 111. Because it is unnecessary to get permission from the terminal device 101 for the provision of the personal information to the service provider device 114 every time, the user agent device 111 reads only the items of the personal information stored in the user profile database 110 that have been requested by the service provider device 114 and outputs these items to the proxy device 109 in step S45. In step S46, the proxy device 109 outputs the received items of personal information to the service provider device 114.

Namely, the above-mentioned processing is the processing of steps S21 through S30 shown in FIG. 4 minus the user confirmation processing of steps S25 through S28.

Thus, every time the personal information is read from the user profile database 110, the user agent device 111 increments the read count by one and holds the updated count value in the counter. When the count value has reached a predetermined value (10 for example), the user agent device 111 generates a user interface on its own independently of the OPS session performed with the service provider device 114 in step S47, outputting the generated user interface to the proxy device 109. In step S48, the proxy device 109 transfers the received user interface to the terminal device 101. Consequently, the fact that the personal information reading count has reached the predetermined value (10 in this example) is displayed on the monitor of the terminal device 101 as shown in FIG. 7.

In step S47, for the interface for the user agent device 111 to inform the proxy device 109, the same interface as that used between user agent devices in a general personal computer can be used, thereby achieving the sharing of software systems.

The proxy device 109 converts the user interface received from the user agent device 111 into an HTML format and transfers the resulting user interface to the terminal device 101 by HTTP in step S48.

Figure 7:
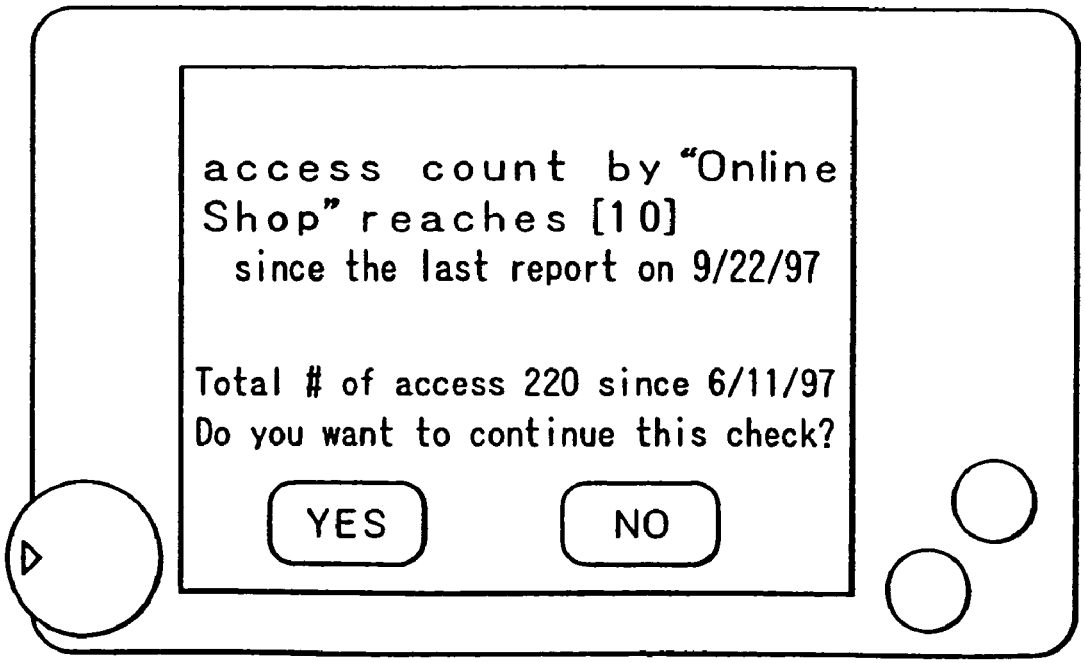
FIG. 7 is a display example on the terminal device 101 in step S48 of FIG. 6.

Viewing the user interface image as shown in FIG. 7, the user determines whether to permit or reject the provision of the personal information by operating the YES button or the NO button. The result of this operation is sent from the terminal device 101 to the proxy device 109 in the HTTP protocol in step S49. In step S50, the proxy device 109 also informs the user agent device 111 of this operational result through an internal interface. Receiving the operational result, the user agent device 111 resets to zero the value of the counter for counting the number of times the personal information has been provided to the service provider device 114, thereby ending the processing.

Figure 8:
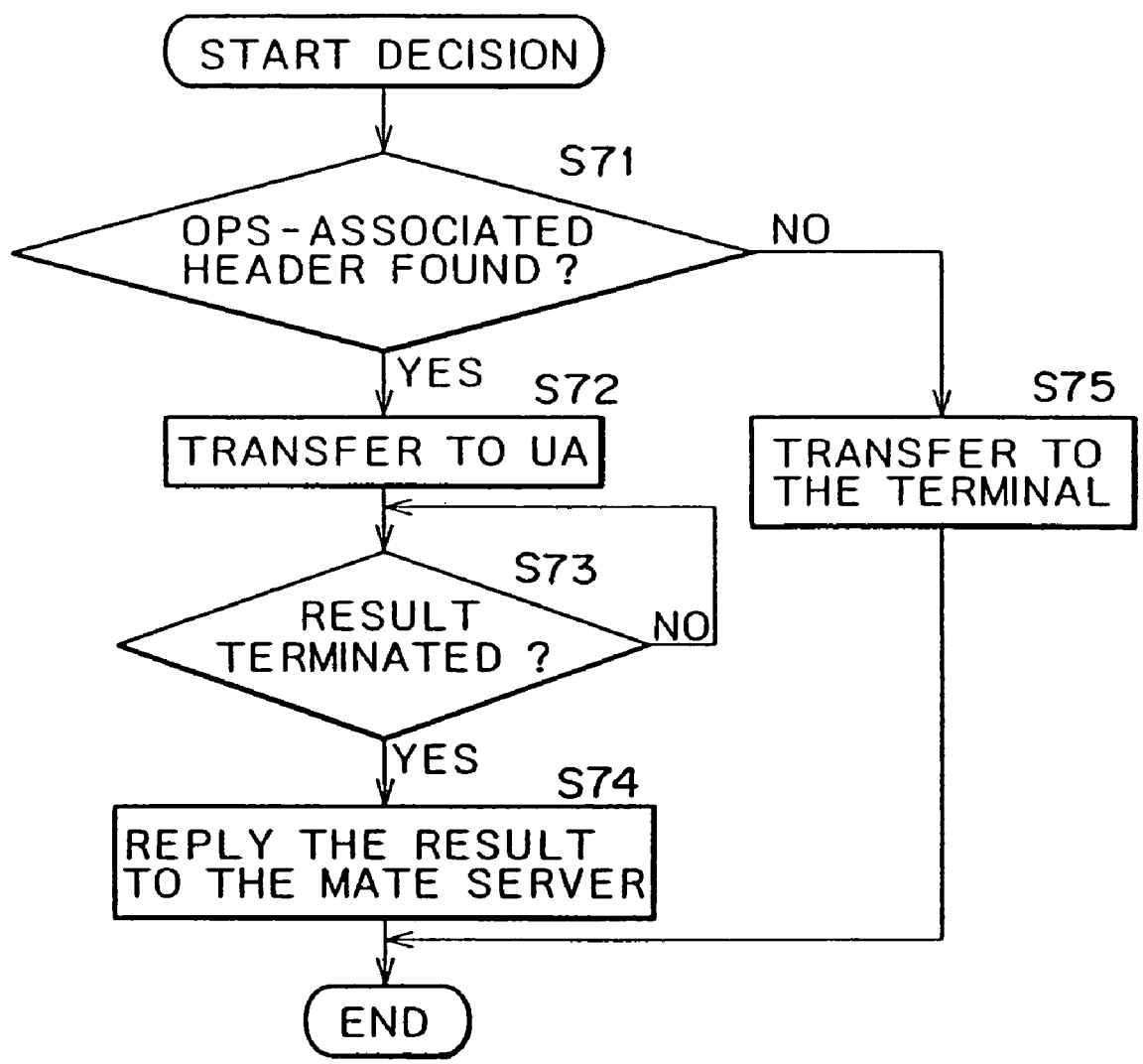
FIG. 8 is a flowchart indicative of another operation of the proxy device 109 shown in FIG. 1.

Thus, the proxy device 109 must determine whether the request to read received from the service provider device 114 requires user confirmation or not. FIG. 8 shows details of this determining operation.

To be more specific, in step S71, the proxy device 109 determines whether the request to read transmitted from the service provider device 114 has an OPS-associated header or not. If the request has no OPS-associated header, then, in step S75, the proxy device 109 transfers the data received from the service provider device 114 to the terminal device 101. Thus, the data transmitted from the service provider device 114 in step S13 of FIG. 3 for example is transferred from the proxy device 109 to the terminal device 101 without change in step S14.

On the other hand, if the data received from the service provider device 114 is found having an OPS-associated header in step S71, then the proxy device 109 transfers this data to the user agent device 111 in step S72. Thus, in step S24 of FIG. 4 or step S44 of FIG. 6 for example, the session start and the request to read are sent from the proxy device 109 to the user agent device 111.

Next, in step S73, the proxy device 109 waits until necessary information comes from the user agent device 111 and, when the necessary information has come, transfers this personal information to the service provider device 114 in step S74.

As described, referring to the timing chart shown in FIG. 4 for example, the proxy device 109, after informing the user agent device 111 in step S24, waits until the personal information comes from the user agent device 111 in step S29 and, when the personal information has come, transfers the same to the service provider device 114 in step S30.

Likewise, referring to the timing chart shown in FIG. 6, the proxy device 109, after informing the user agent device 111 in step S44, waits until the personal information comes from the user agent device 111 in step S45, and, when the personal information has come, transfers the same to the service provider device 114 in step S46.

Figure 9:
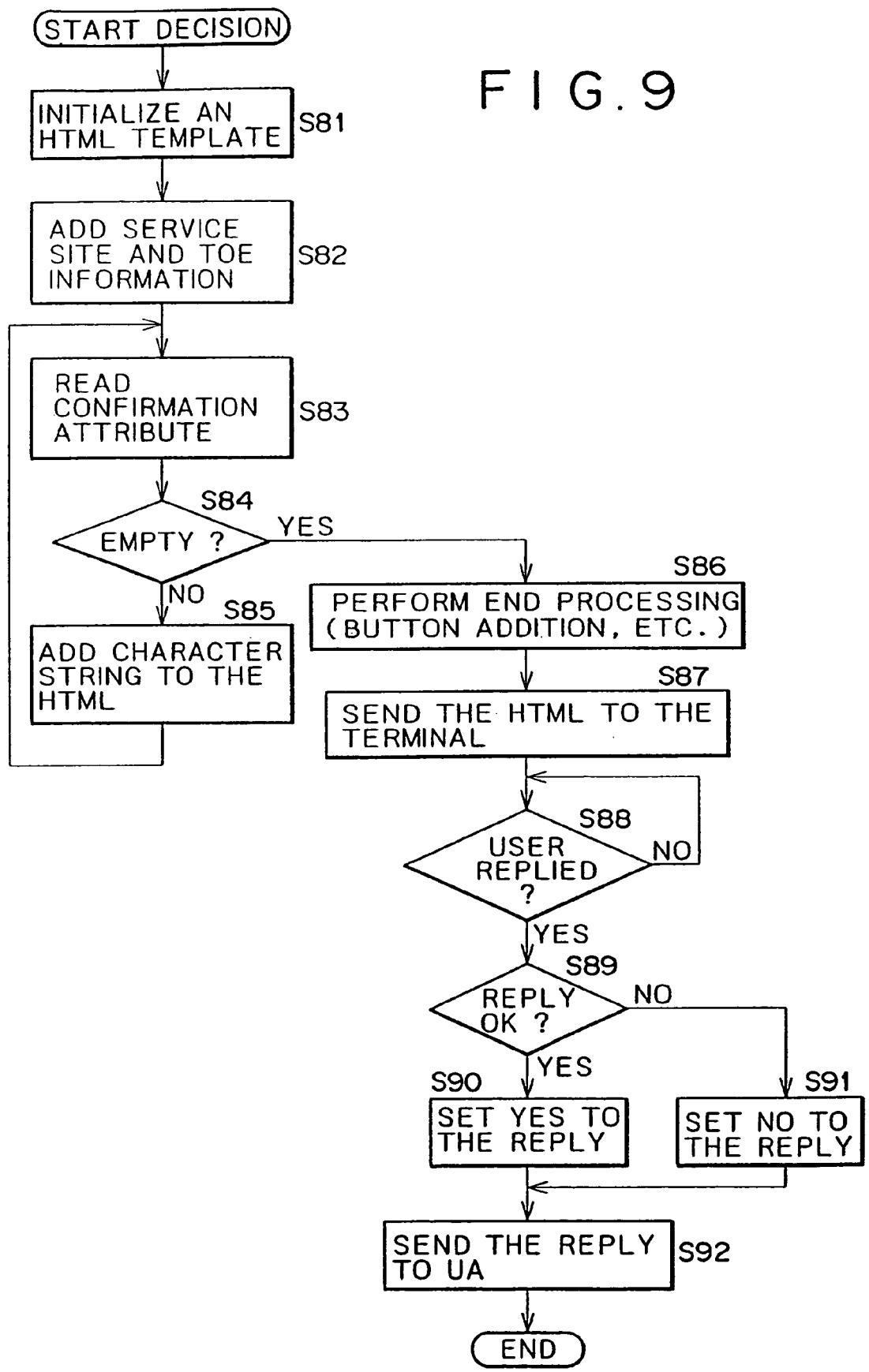
FIG. 9 is a flowchart indicative of still another operation of the proxy device 109 shown in FIG. 1.

The following describes, with reference to the flowchart shown in FIG. 9, the processing to be executed by the proxy device 109 when the user agent device 111 has sent the user interface to the proxy device 109 in step S25 (step S111 of FIG. 10 to be described later) of FIG. 4 and the proxy device 109 gets the confirmation of the user from the terminal device 101 based on the received user interface.

In step S81, the user proxy device 109 initializes a predetermined HTML template and, in step S82, writes the identifier and TOE (Term Of Exchange) of the service provider device 114 that transferred the request to read onto the initialized HTML template. This TOE represents, in a character string, a manner of using the personal information by the service provider device 114 (for example, whether the personal information is to be used only by the service provider of the service provider device 114 or the personal information is to be provided by the service provider to another service provider for use thereby). In the example of FIG. 5, the TOE denotes that the personal information is to be used only by the service provider of the service provider device 114 ("their own use only").

Next, in step S83, the proxy device 109 extracts one of the items (the personal information requested by the service provider device 114) to be confirmed by the user and reads the attribute of this item. In step S84, the proxy device 109 determines whether there is no more item to be confirmed (whether all items have been entered in the template). If there is any item to be confirmed, then, in step S85, the proxy device 109 adds a character string representing the attribute of that item to the HTML template. The above-mentioned processing is repeated until there is no more item to be confirmed in step S84. Thus, "age," "annual income," and "occupation" shown in FIG. 5 for example are added to the template.

If, in step S84, there is no more item to be checked (namely, all items to be confirmed have been entered in the template), then, in step S86, the proxy device 109 executes end processing such as adding a button and outputs the resulting HTML template to the terminal device 101 in step S87.

Next, in step S88, the proxy device 109 waits until the user (or the terminal device 101) makes a reply. If a reply comes, then, in step S89, the proxy device 109 determines the reply. If the reply is found to be a YES, then, in step S90, the proxy device 109 sets "YES" to the reply and outputs the resultant reply to the user agent device 111 in step S92. If the reply is found to be a NO, then, in step S91, the proxy device 109 sets "NO" to the reply and outputs the resultant reply to the user agent device 111 in step S92.

Figure 10A:
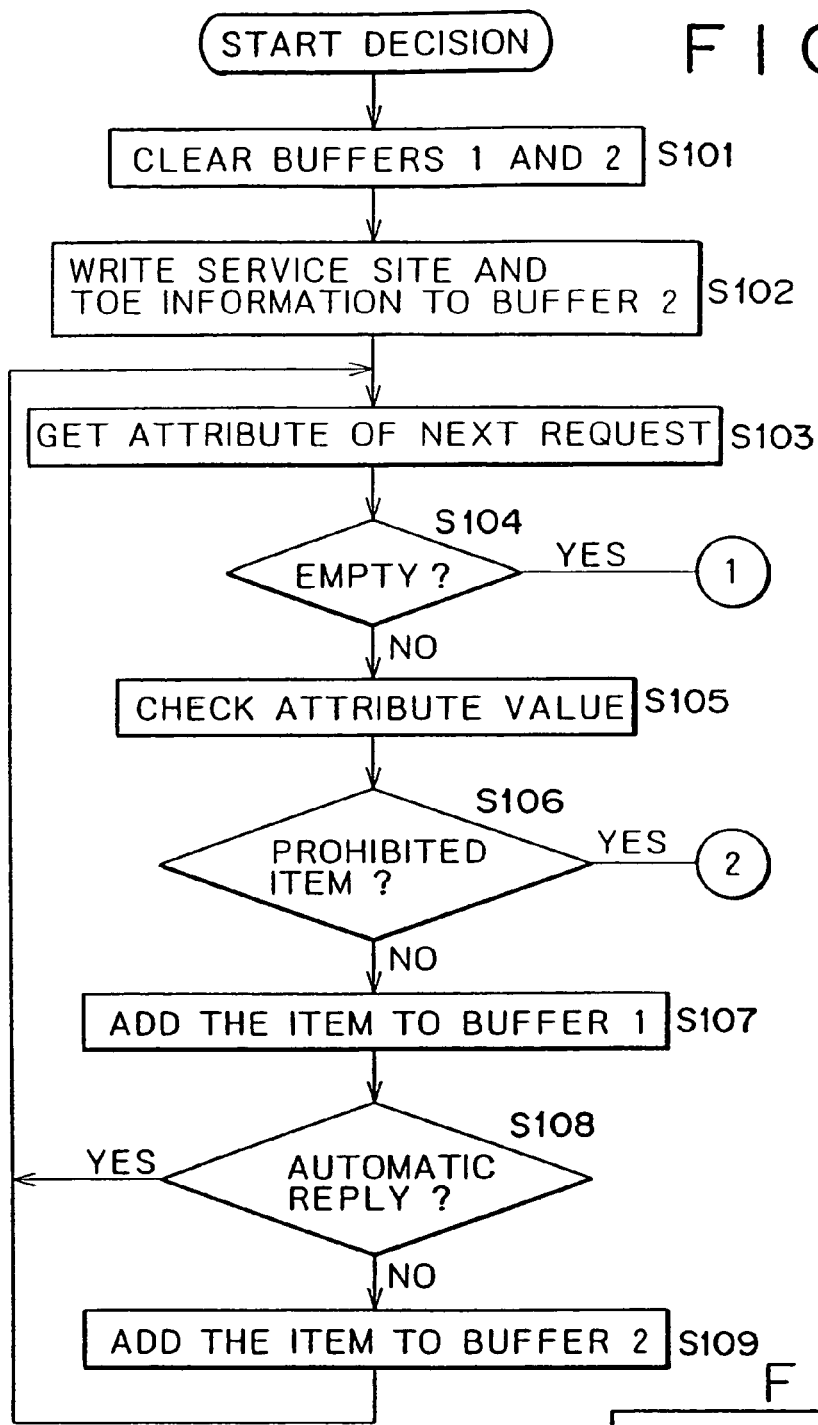
FIGS. 10A and 10B are flowcharts indicative of the operation of the user agent device 111 shown in FIG. 1.
Figure 10:
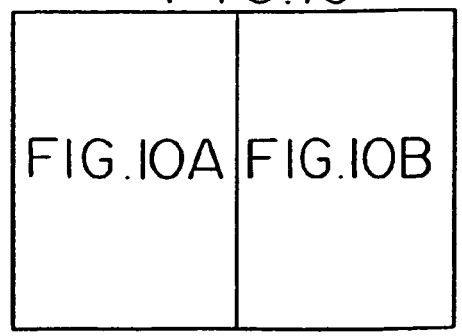
Figure 10B:
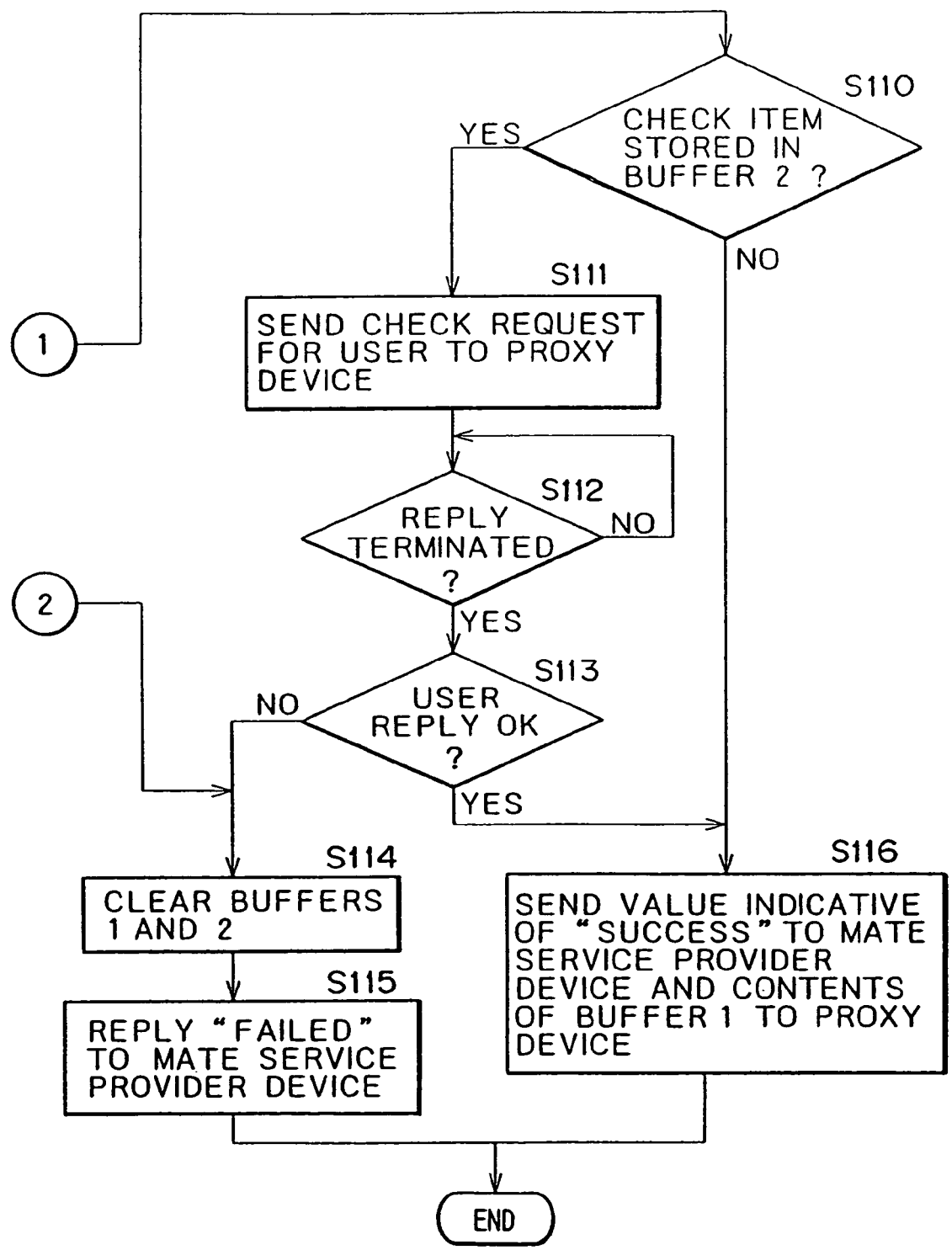

The following describes, with reference to the flowcharts shown in FIGS. 10A and 10B, detailed processing to be executed when the user agent device 111 receives from the proxy device 109 a request to read personal information from the user profile database 110 in step S24 of FIG. 4 or step S44 of FIG. 6 for example.

First, in step S101, the user agent device 111 clears incorporated buffer 1 and buffer 2 (not shown) and enters the identifier and TOE of the service provider device 114 that requested personal information into the buffer 2 in step S102. Next, in step S103, the user agent device 111 extracts the personal information item requested by the service provider device 114 and gets the attribute of the item. In step S104, the user agent device 111 determines whether there is no more personal information item to be obtained. If another personal information item is found, then, in step S105, the user agent device 111 checks the attribute of that personal information. In step S106, the user agent device 111 determines whether the attribute of the personal information checked in step S105 is an item (prohibited item) disabled for being provided to the service provider device 114. If the item is found disabled, then, in step S107, the user agent device 111 writes that item (a character string representing the attribute) to the buffer 1 that stores the contents of the reply.

In step S108, the user agent device 111 determines whether the attribute of the item is enabled for automatic reply (confirmation by the user is unnecessary before provision). If the item is found enabled for automatic reply, then, back in step S103, the user agent device 111 gets the attribute of a next item. For example, generally, user name and user gender are regarded as items having an attribute enabled for automatic reply.

On The other hand, if the item is found disabled for automatic reply in step S108, then the user agent device 111 records this item into the buffer 2 that stores the check list in step S109. Then, back in step S103, the user agent device 111 repeats the processing of step S103 and the subsequent steps. For example, user age, user annual income, and user occupation are entered in the check list to be checked by the user as shown in FIG. 5.

If the item is found disabled for provision in step S106, then the user agent device 111 clears the buffer 1 and the buffer 2 in step S114 and sends a reply "Failed" to the service provider device 114 in step S115, terminal the processing. Namely, if any one of the items that is disabled for provision is included in the personal information requested by the service provider device 114, the protection of the personal information is selected and the processing is terminated at the point (the provision of service from the service provider device 114 is canceled).

On the other hand, if the user agent device 111 determines in step S104 that all items requested by the service provider device 114 have been written to the buffer 1 or the buffer 2, then the user agent device 111 determines in step S110 whether the check item is entered in the buffer 2 of the check list. Namely, as described above, the items disabled for automatic reply (the items to be checked by the user) are stored in the check list of the buffer 2 in step S109. If the predetermined items are found in the check list of the buffer 2, then, in step S111, the user agent device 111 outputs to the proxy device 109 a request for the user to check the items stored in the check list of the buffer 2. Receiving this request, the proxy device 109 transfers the user interface to the terminal device 101 for confirmation processing as described with reference to FIG. 9. When the result of the confirmation has been obtained, the proxy device 109 transfers the obtained result to the user agent device 111.

Then, in step S112, the user agent device 111 waits until the proxy device 109 makes a reply. When the reply comes, then, in step S113, the user agent device 111 determines the received reply. If the reply is found to be disabling, the transfer of that item to the service provider device 114, then, as with the case in which a prohibited item is found, the user agent device 111 clears the buffer 1 and the buffer 2 in step S114. In step S115, a reply "Failed" is outputted to the service provider device 114.

On the other hand, if, in step S113, the reply from the user is found to be permitting, the provision of the items in the check list to the service provider device 114 (namely, if the YES button shown in FIG. 5 was pressed), then the user agent device 111 goes to step S116 to transfer to the proxy device 109 the value indicative of successful reply (the pressing of the YES button shown in FIG. 5) for the service provider device 114 and the contents of the item recorded in the buffer 1. As described above, the proxy device 109 transfers this item to the service provider device 114.

If, in step S110, if no check item is found in the check list of the buffer 2, it indicates that only the items enabled for automatic reply (the items that need not be checked by the user) are entered in the buffer 1, so that the processing for transferring the contents of the buffer 1 to the proxy device 109 is executed in step S116.

Figure 11:
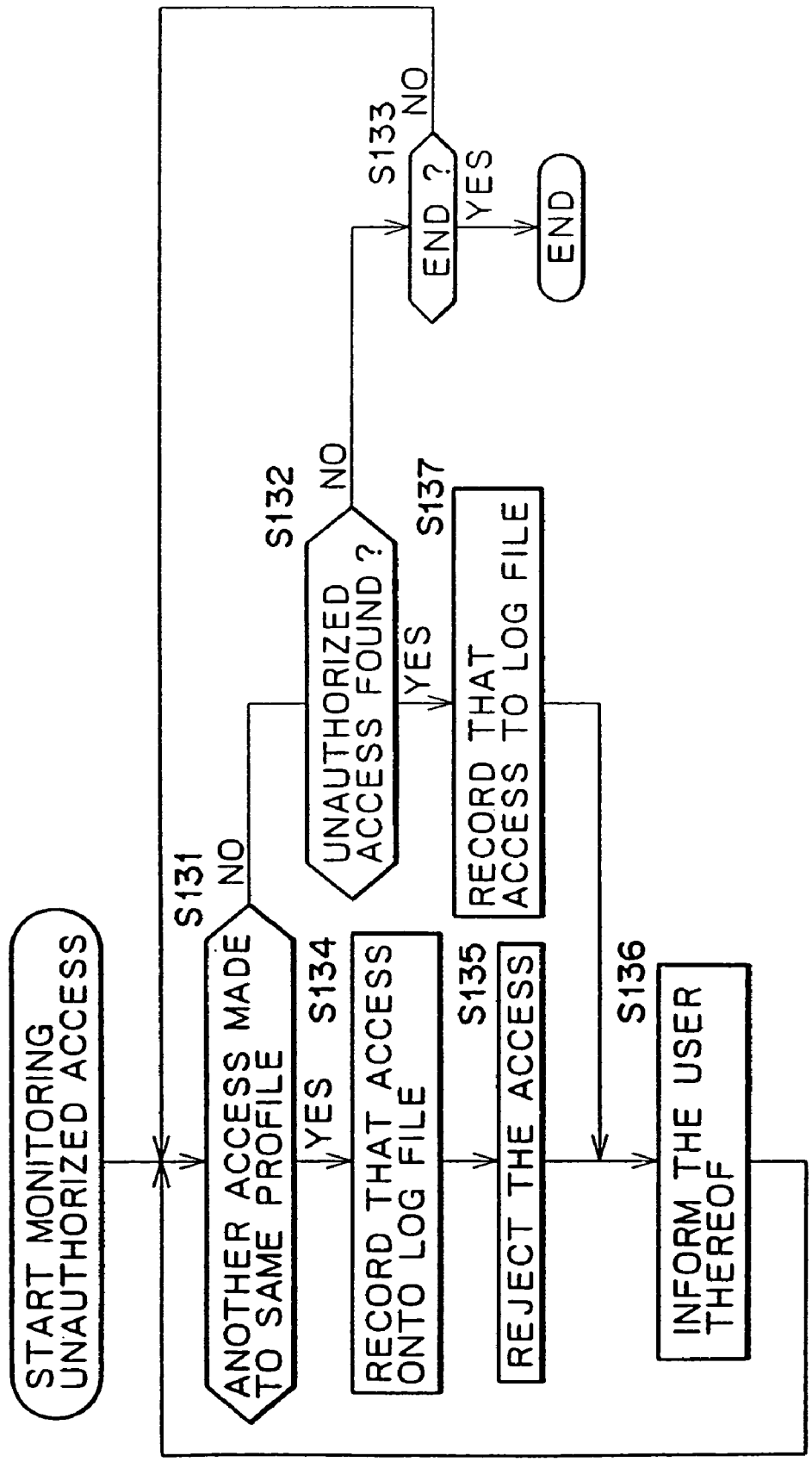
FIG. 11 is a flowchart indicative of another operation of the proxy device 109 shown in FIG. 1.

Further, in the case that another user attempts to use the personal information of a predetermined user in an unauthorized manner, a capability of preventing unauthorized access to the personal information can be added to the user agent device 111 (or the proxy device 109). FIG. 11 shows an example of the processing by the user agent device 111 for preventing the unauthorized access. In this example, the prevention processing starts when a predetermined user accesses the server 100 and the user agent device 111 is generated.

First, in step S131, the user agent device 111 determines whether the same profile (personal information) of that user has been accessed from two or more different places (for example, remote places) that cannot make access at the same time. If such an access is found made, then, in step S134, the user agent device 111 records the fact of that access to a log file of the user agent device 111. In step S135, the user agent device 111 rejects any access made at a later point in time. In step S136, the user agent device 111 informs, through the proxy device 109, the user terminal device 101 accessed before (or the carrier (access administrator) controlling the access point at which such an access was made) of the fact that there has been another access to the personal information of that user. Then, back in step S131, the user agent device 111 repeats the processing of step S131 and subsequent steps.

In step S131, if no other access is found made to the same profile, the user agent device 111 checks for other unauthorized accesses in step S132. If no unauthorized access is found, the user agent device 111 determines in step S133 whether the end of the access with the session established has been instructed. If the end has not been instructed, then, back in step S131, the user agent device 111 repeats the processing of step S131 and subsequent steps. If the end of the access has been instructed, the processing is terminated.

In step S132, if another unauthorized access is found to have been performed, the user agent device 111 goes to step S137 to record the fact of this unauthorized access to the log file. Then, in step S136, the user agent device 111 informs the user or the carrier of the fact. This arrangement can instantly identify unauthorized access attempts.

Figure 12:
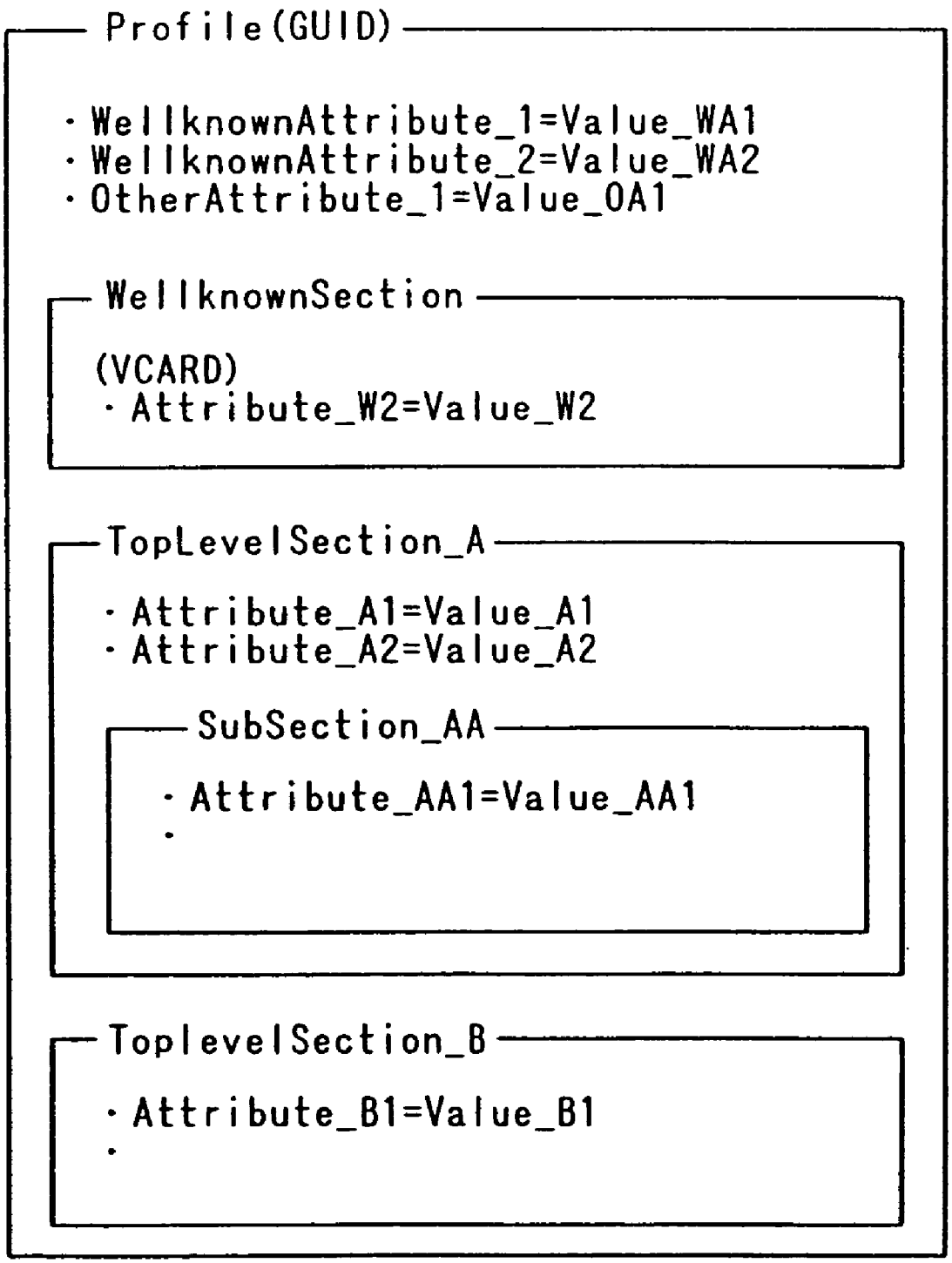
FIG. 12 is a diagram illustrating a configuration example of a profile of a user profile database 110 shown in FIG. 1.

FIG. 12 shows an example of the configuration of the user profile stored in the user profile database 110. The format of this profile corresponds to the OPS format. The profile of each user records a GUID (Globally Unique ID). This GUID is unique to the profile of each user.

Referring to FIG. 12, VCARD is also referred to as an electronic visiting card, on which user's country, postal code, age, gender, favorite screen name, name, photograph, birth day, address, telephone number, electronic mail address, title, and occupation are recorded for example. VCARD allows only its user to write these pieces of information.

To top level sections A and B have sub sections. The necessary pieces of personal information are appropriately entered in these sections.

It should be noted that, in addition to the OPS format, the user profile may also be configured by the P3P format.

The above-mentioned capabilities assume the use on the terminal device 101 as a mobile device or setup devices, which are limited in the resources and expandability of personal computers. However, these capabilities may also be used by the ordinary personal computer 106. In this case, although the communication stack below the transport layer is different between the personal computer 106 and the server 100, a same communication stack is available on the application level. The highest advantage of such a use form is that the same user profile database 110 can be shared between the terminal device 101 and the personal computer 106. Therefore, the profile data updated by any of these devices is made available with reliability for the later access by any of these devices.

Thus, the use of the server 100 for performing proxy services allows any simple terminal devices with only user interface installed to transfer data associated with personal privacy information in an open environment such as the Internet. In addition, because the server 100 is compatible with the functional expansion of the network side, the user can use new capabilities while using the simple terminal device.

For a transmission medium for transmitting the computer programs that execute the above-mentioned various processing operations to the user, communication media such as a network and a satellite are available in addition to recording media such as a magnetic disc, a CD-ROM, and a solid memory.

As described and according to the information processing apparatus of the present invention, when access is made by the user and a request is made from an information provider, stored personal information is provided to the information provider on behalf of the user. Consequently, authorized personal information can be securely transmitted without error to the information provider, thereby allowing the information provider to securely perform billing processing for the information to be provided. In addition, the user can securely provide his or her personal information from any mobile location in the same environment. Further, if the communication form between the user and the information provider has changed due to functional expansion or troubleshooting, for example, the information processing apparatus of the user need not be changed accordingly, thereby saving the user's maintenance load.

Moreover, according to the information processing apparatus of the present invention the server controls the provision of stored personal information to an information provider when a request for the stored personal information comes from the information provider. Consequently, the user can provide his or her personal information to the information provider as required through a low-cost apparatus, from any location, and with reliability.

As many apparently different embodiments of this invention may be made without departing from the spirit and scope thereof, it is to be understood that the invention is not limited to the specific embodiments thereof except as defined in the appended claims.

What is claimed is:

1. An information processing method in an information processing apparatus for processing information between a plurality of service providers and a user, wherein each of the plurality of service providers has a corresponding service provider device, the method comprising the steps of:

storing personal information of the user;

receiving a request to perform a transaction with one of the plurality of service provider devices from a terminal device operated by the user;

identifying a manner in which the personal information will be used by one of the plurality of service provider devices;

identifying one or more items requested by one of the plurality of service provider devices from the stored personal information; and sending the manner or the one or more items requested by one of the plurality of service provider devices to the terminal device to be displayed at the terminal device, wherein the terminal device displays at least one button usable for determining whether to provide the one or more items to one of the plurality of service provider devices.

2. The information processing method of claim 1, wherein the at least one button includes a positive (yes) button of provision of personal information and a negative (no) button of prohibition of personal information.

3. An information processing apparatus for processing information between a plurality of service providers and a user, wherein each of the plurality of service providers has a corresponding service provider device, the information processing apparatus comprising:

means for storing personal information of the user;

means for receiving a request to perform a transaction with one of the plurality of service provider devices from a terminal device operated by the user;

means for identifying a manner in which the personal information will be used by one of the plurality of service provider devices;

means for identifying one or more items requested by one of the plurality of service provider devices from the stored personal information;

means for sending the manner or the one or more items requested by one of the plurality of service provider devices to the terminal device to be displayed at the terminal device; and at least one button usable for determining whether to provide the one or more items to one of the plurality of service provider devices.

4. The information processing apparatus of claim 3, wherein the at least one button comprises a positive button of provision of personal information and a negative button of prohibition of personal information.

* * * * *

UNITED STATES PATENT AND TRADEMARK OFFICE
CERTIFICATE OF CORRECTION

PATENT NO. : 7,284,063 B2
APPLICATION NO. : 10/688344
DATED : October 16, 2007
INVENTOR(S) : Tatsuo Itabashi and Kimiyoshi Yoshida Page 1 of 1

It is certified that error appears in the above-identified patent and that said Letters Patent is hereby corrected as shown below:

Col. 1 - lines 7-8

"The present application claims priority to Japanese Application No. 10-3067357 filed October 14, 1997,"

should be

--The present application claims priority to Japanese Application No. 9-280154 filed October 14, 1997,--

Signed and Sealed this

Twentieth Day of May, 2008

JON W. DUDAS
*Director of the United States Patent and Trademark Office*